ically to be $BF_3 \cdot N_2O_4$. The combining volumes of boron
United States Patent Office 3,061,404
Patented Oct. 30, 1962

3,061,404
PROCESS FOR PRODUCING A COMPLEX OF BORON TRIFLUORIDE AND NITROGEN TETROXIDE
Gustave B. Bachman, West Lafayette, Ind., and Bernard R. Bluestein, Chicora, Pa., assignors to Purdue Research Foundation, Lafayette, Ind., a corporation of Indiana
No Drawing. Filed Dec. 12, 1955, Ser. No. 552,256
4 Claims. (Cl. 23—14)

Our invention relates to a new composition of boron trifluoride and nitrogen tetroxide and more particularly, it relates to a complex between boron trifluoride and nitrogen tetroxide in a molar ratio of one to one and to the method of producing the same.

Kuhlmann in 1841 reported in Ann. 39, 320, that boron trifluoride reacted with nitric oxide but he did not identify the product nor give any analytical data from which the composition of the product could be calculated. Batey and Sisler reported in the Journal of the American Chemical Society, vol. 74, page 3408, that when nitryl chloride was contacted with boron trifluoride, no reaction took place except that the boron trifluoride did react with nitrogen tetroxide impurity in the nitryl chloride to produce $N_2O_4 \cdot 2BF_3$, a white crystalline solid. We have now discovered a new composition which is a complex between boron trifluoride and nitrogen tetroxide, $BF_3 \cdot N_2O_4$. Our new composition and the method of producing it have not previously been described.

The complex $BF_3 \cdot N_2O_4$ is highly hygroscopic and reacts rapidly with water and most other solvents except the aliphatic hydrocarbons, their polychlorinated derivatives and the nitroalkanes. It is practically insoluble in all solvents with which it does not react. It is a white waxy solid, amorphous in form, which sublimes rapidly at room temperature and dissociates at elevated temperatures with the formation of red fumes. Attempts to determine a melting point in sealed tubes resulted in no liquid phase up to 300° C. but with increasing dissociation. The composition of the complex has been determined gravimetrically to be $BF_3 \cdot N_2O_4$. The combining volumes of boron trifluoride and nitrogen tetroxide were determined carefully employing volumetric methods, and the structure $BF_3 \cdot N_2O_4$ thereby corroborated.

As indicated above, our new composition is insoluble in most solvents with which it does not react. Water and most organic solvents containing oxygen atoms such as methanol, ethanol, acetic acid, diethyl ether, tetrahydrofuran, acetone, etc., react to destroy the complex with the evolution of nitrogen dioxide or its reaction products with the solvent. Certain types of non oxygen-containing solvents such as benzene, tetrahydrobenzene, toluene, chlorobenzene, etc., react with the complex to give nitration products. The complex does not react with and can safely be stored at room temperature or below in such solvents as nitromethane, nitroethane, 2-nitropropane, carbon tetrachloride, chloroform, and petroleum ether, although it is not soluble in these solvents.

Our new complex of boron trifluoride and nitrogen tetroxide can be prepared by reacting boron trifluoride with nitrogen tetroxide. The reaction is highly exothermic and must be carried out under carefully controlled temperature conditions. The reaction can be carried out by passing gaseous boron trifluoride (boiling point = —101° C.) into liquid nitrogen tetroxide (boiling point 21.3°) or the two reactants can be combined in the gaseous state. We can use and we prefer to use an inert solvent such as nitromethane, nitroethane, 2-nitropropane, carbon tetrachloride, chloroform, petroleum ether, etc., in carrying out the reaction and in so doing we mix dry liquid nitrogen tetroxide with the inert solvent and pass gaseous boron trifluoride into the mixture of solvent and nitrogen tetroxide whereby the insoluble complex is produced and is precipitated from the reaction mixture. Because of the fact that the complex reacts with water, the reaction must be carried out in the absence of water using dry nitrogen tetroxide. Dry liquid nitrogen tetroxide can be obtained by the method of Henderson and Fernelius, Organic Preparations, McGraw-Hill Book Company, Inc. (1935), page 44. We prefer to place dry nitromethane or nitroethane cooled to between 0 and —5° C. in a suitable container and add dry liquid nitrogen tetroxide to the cooled solvent with rapid stirring. We then pass gaseous boron trifluoride into the reaction vessel, stirring constantly and vigorously, the point of introduction being below the liquid level of solvent and nitrogen tetroxide, at a rate fast enough to prevent the solvent from backing up into the gas inlet tube and until dense white fumes are observed emitting from the top of the condenser which should be fitted to the reaction vessel. The flow of boron trifluoride should be discontinued upon emission of the white fumes and then after a few minutes, several additional small portions of the gas should be added to insure complete reaction of all of the nitrogen tetroxide. The white solid complex of nitrogen tetroxide and boron trifluoride is insoluble in the inert solvent and precipitates out of solution as it is being formed. The yield is essentially quantitative.

The following example is offered to illustrate the production of our new complex but we do not intend to be limited to the particular materials, proportions, or procedure shown. Rather we intend to include within the scope of our invention all equivalents obvious to those skilled in the art.

Example 1

A 350-ml. portion of dry nitromethane cooled to between 0 and —5° C. was placed in a 3-neck 1,000 ml. round bottom flask fitted with an all glass stirrer, a large reflux condenser, and a gas inlet tube which was long enough to extend below the surface of the reaction mixture in the flask. To the cooled nitromethane was then added 100 grams of dry liquid nitrogen tetroxide with rapid stirring and gaseous boron trifluoride was then bubbled into the reaction vessel until dense white fumes were observed emitting from the top of the condenser. The flow of boron trifluoride was discontinued for several minutes after which several more small portions of the gas were added to insure complete reaction of all of the nitrogen tetroxide. The white solid addition complex of boron trifluoride and nitrogen tetroxide precipitated from the solution as it was being formed. The amount of complex obtained was about 174 grams.

Our new complex of boron trifluoride and nitrogen tetroxide is a useful nitrating agent and can be used to nitrate compounds having an aromatic nucleus. Such compounds as benzene, chlorobenzene, toluene, naphthalene, xylene, cymene, etc., can be satisfactorily nitrated using our new complex. In carrying out the nitration process, the aromatic carboxylic compound to be nitrated is contacted with the complex of boron trifluoride and nitrogen tetroxide and the nitration products subsequently isolated. The reaction can be conducted over a wide range of temperatures, depending upon the compound to be nitrated. For example, when nitrating naphthalene, we prefer to employ low temperatures in order to avoid tar formation but when nitrating benzene, for example, we prefer to employ relatively high temperatures since when benzene is nitrated at room temperature, a yield of 39% of nitrobenzene is obtained in one week. We prefer to effect nitration employing our new complex in the presence of an inert solvent for the material being nitrated.

Since the complex is essentially insoluble in nearly all solvents with which it does not react, we mean by the term inert solvent, a solvent for the material being nitrated which is inert as far as the complex is concerned, and obviously, the inert solvent must be one with which the material to be nitrated does not react but in which it merely dissolves. Suitable solvents include nitromethane, nitroethane, 2-nitropropane, carbon tetrachloride, chloroform, petroleum ether, etc., if the solvents do not react with the particular material being nitrated.

We wish to point out that our complex can be formed in situ with the material to be nitrated and in such case the complex is used as it is produced. In producing the complex in this manner, we pass gaseous boron trifluoride and gaseous nitrogen tetroxide to the mixture of inert solvent and material to be nitrated or we premix dry liquid nitrogen tetroxide with the inert solvent and material to be nitrated and pass gaseous boron trifluoride into the mixture.

The following example is offered to illustrate the manner in which our new complex of boron trifluoride and nitrogen tetroxide is employed in the nitration of naphthalene.

Example II

A 200-ml. portion of nitroethane was mixed with 80 grams of the complex of boron trifluoride and nitrogen tetroxide and the mixture stirred rapidly in a 500 ml. round bottom flask cooled with crushed ice until the temperature reached 0° C. The flask was equipped with a 250 ml. dropping funnel and a large reflux condenser. A solution of 30 grams of naphthalene in 200 ml. of nitroethane was cooled to 0° C. and added dropwise with rapid stirring. Stirring was continued at 0° C. for 5 hours after which an additional 20 grams of the complex of boron trifluoride and nitrogen tetroxide was slowly added in small portions. The reaction mixture was allowed to stand at 0° C. for a short period after which it was warmed to room temperature and allowed to stand for five hours. The reaction mixture was then subjected to gentle heating for three hours to drive off nitrogen dioxide after which the reaction mixture was cooled and filtered to remove any excess complex which remained. The filtrate was mixed with 500 ml. of ice water and the organic layer then washed twice with 100 ml. portions of water after which the organic layers were combined, dried over anhydrous calcium chloride and transferred to a distillation apparatus where excess nitroethane was stripped off under vacuum. The remaining liquid was cooled in a Dry Ice Dewar vessel until it solidified, the solid being a mixture of 1,5-dinitronaphthalene and 1,8-dinitronaphthalene. The combined yield of the two dinitronaphthalenes was 36.5 grams amounting to 65%.

Now having described our invention, what we claim is:

1. A process for the production of a complex of boron trifluoride and nitrogen tetroxide having the formula $BF_3 \cdot N_2O_4$ which comprises contacting at temperatures below that at which substantial decomposition of nitrogen tetroxide takes place nitrogen tetroxide with gaseous boron trifluoride in the presence of an inert solvent and separating the precipitated complex of $BF_3 \cdot N_2O_4$ from the inert solvent.

2. A process for the production of a complex of boron trifluoride and nitrogen tetroxide having the formula $BF_3 \cdot N_2O_4$ which comprises contacting nitrogen tetroxide with gaseous boron trifluoride in the presence of an inert solvent at a temperature below the boiling point of nitrogen tetroxide and separating the precipitated complex of $BF_3 \cdot N_2O_4$ from the inert solvent.

3. A process for the production of a complex of boron trifluoride and nitrogen tetroxide having a formula $$BF_3 \cdot N_2O_4$$

which comprises contacting at 0—-5° C. nitrogen tetroxide and gaseous boron trifluoride in the presence of nitromethane and separating the precipitate of $BF_3 \cdot N_2O_4$ from the nitromethane.

4. A process for the production of a complex of boron trifluoride and nitrogen tetroxide having the formula $$BF_3 \cdot N_2O_4$$

which comprises passing gaseous boron trifluoride into an inert solvent solution of nitrogen tetroxide maintained at a temperature below the boiling point of nitrogen tetroxide and separating the precipitated complex of $BF_3 \cdot N_2O_4$ from the inert solvent.

References Cited in the file of this patent

Some Inorganic Reactions of Nitryl Chloride by Batey et al., J.A.C.S., vol. 74, page 3409 (1952).

Comprehensive Treatise on Inorganic and Theoretical Chemistry (Mellor), publ. by Longmans, Green and Co. (London), 1924, vol. 5, page 132.

Kuhlman: Annalen der Chemie und Pharmacie, vol. 39, page 320 (1841).

Booth and Martin: "Boron Trifluoride and Its Derivatives," N.Y., John Wiley and Sons, Inc., 1949, page 34.